United States Patent Office 3,477,842
Patented Nov. 11, 1969

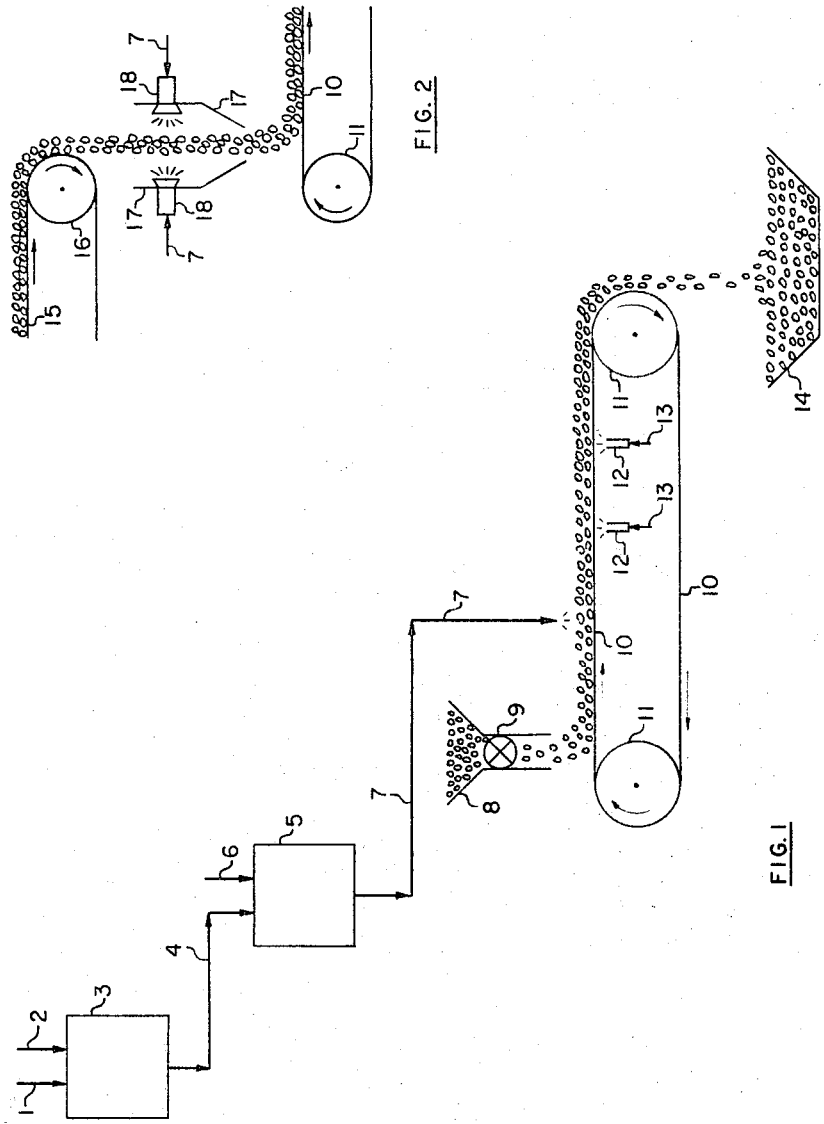
LUCIEN H. COOK
SYDNEY ATKIN
INVENTORS

3,477,842
MANUFACTURE OF FREE FLOWING FERTILIZER PRODUCT BY COATING GRANULES WITH UREA-FORMALDEHYDE FROM AN ALKALINE SOLUTION
Lucien H. Cook, Port Washington, N.Y., and Sydney Atkin, Springfield, N.J., assignors to Chemical Construction Corporation, New York, N.Y., a corporation of Delaware
Filed Oct. 10, 1966, Ser. No. 585,633
Int. Cl. C05c 9/02, 1/02, 7/00
U.S. Cl. 71—28                                   6 Claims

ABSTRACT OF THE DISCLOSURE

Solid fertilizer particles are coated with an alkaline urea-formaldehyde solution formed at a pH generally in the range of 7.5 to 10.0, and the solution coating is dried, to produce particles of fertilizer material which are substantially non-hygroscopic and resistant to agglomeration, due to the exterior formation of a hard solid layer of alkaline urea-formaldehyde condensation product on the surface of the fertilizer particles. The resulting improved fertilizer product is free flowing, non-caking, and capable of being stored for extended periods of time.

---

The present invention relates to the production of a free-flowing fertilizer product. It has been determined that the agglomeration of fertilizers such as urea may be prevented by dispersing a solubilized urea-formaldehyde solution at an initial pH above 7.0 onto solid fertilizer particles, in the form of a layer of solution, and thereafter removing water from the solution layer. The resulting solid fertilizer product is free-flowing and is capable of being stored for extended periods of time without agglomeration or caking.

Fertilizer materials such as urea, ammonium nitrate, ammonium sulfate, ammonium phosphate, superphosphate and triple superphosphate are produced in commercial facilities in the form of prills, crystals, extruded pellets or other solid discrete particle forms. These facilities, for economic reasons, generally operate on a continuous year-round basis. However, the demand for fertilizers is seasonal, with the peak demand generally occurring during the spring planting season. Thus, it is necessary to store solid fertilizers for extended periods of time. The fertilizers must be free-flowing and non-caking for agricultural usage, in order that the solid fertilizer material may be uniformly and evenly distributed by the conventional farm machinery. One of the problems encountered in the storage of solid fertilizer materials is that the particles have a tendency to agglomerate, usually because the fertilizer material is somewhat hydroscopic, with the result that the fertilizer material tends to cake or form a solid mass.

Numerous procedures or techniques have been suggested in the prior art, for the prevention of caking or agglomeration of solid fertilizer materials. One of the commonest techniques entails the coating of the solid fertilizer particles with a powdered inert solid, which tends to prevent caking or moisture absorption by providing a layer or coating of inert material on the surface of the fertilizer particle. Clay, diatomaceous earth, and kieselguhr have been employed for this purpose. This coating technique is relatively undesirable, since the inert coating may be removed during handling of the fertilizer material prior to usage, with consequent adverse effects in terms of reduced caking resistance. Another objection to this technique is that the inert material acts as a diluent and reduces the available nitrogen content of the coated fertilizer product.

Another procedure for the prevention of caking of solid fertilizers such as urea entails the provision of a solid condensation product or resin of urea-formaldehyde, which is formed generally by reacting urea with aqueous formaldehyde and is deposited on the surface of the solid urea particles. One technique of this nature entails the exposure of solid urea to gaseous formaldehyde vapor. Procedures of this nature ase described in U.S. Patents Nos. 3,248,-255; 3,235,370; 3,231,363; and 3,112,343 and Canadian Patent No. 691,577. These procedures generally entail the formation of a urea-formaldehyde solution or solid reaction product.

In the present invention, it has been determined that solid particulate fertilizer materials may be rendered free flowing and non-caking, with extended storage life in the free flowing condition, by the use of an alkaline solution of urea-formaldehyde as a coating agent. The solution is generally formed by mixing solid urea with aqueous formaldehyde, and the resulting solution is rendered alkaline with a pH above 7.0 by the addition of a suitable alkalizing or basic compound such as ammonium hydroxide. The alkaline urea-formaldehyde solution is then sprayed or otherwise dispersed onto the surface of the fertilizer particles, so as to deposit a layer of solution on the particles. The water content is then removed from the solution layer, so as to deposit a hard solid layer of urea-formaldehyde condensation product on the surface of the fertilizer particles. The resulting coated fertilizer product consists of particles having an outer layer of urea-formaldehyde condensation product or resin, and is free flowing, non-caking and nonhygroscopic, and is capable of being stored for extended periods of time.

The provision of a suitable alkalizing or basic compound as described supra forms an important aspect and advantage of the present invention, since the alkaline urea-formaldehyde solution is clear and free of solid material, with all of the condensation product or resin being solubilized, and consequently the solution is readily and uniformly distributed on the surface of the fertilizer particles. Another advantage is that a faster reaction takes place, with the formation of an extremely hard coating in a short period of time. The process is also advantageous in that the final fertilizer product is free flowing and non-caking for extended periods of time up to one year or more.

It is an object of the present invention to render fertilizer materials non-caking and free flowing.

Another object is to produce a free flowing and non-hygroscopic fertilizer product.

A further object is to provide an improved form of urea-formaldehyde condensation product as a coating on the surface of fertilizer particles.

An additional object is to provide a process for treating solid urea crystals and prills to render the solid urea particles free-flowing and non-caking.

Still another object is to coat fertilizer material with an improved form of alkaline urea-formaldehyde solution, and thereafter to dry the solution coating, so as to make the particles of fertilizer material resistant to agglomeration and substantially non-hydroscopic, and thus to provide an improved fertilizer product which is free flowing, non-caking, and capable of being stored for extended periods of time.

These and other objects and advantages of the present invention will become evident from the description which follows. Referring to the figures, FIGURE 1 is a flowsheet of a preferred embodiment of the present invention, and FIGURE 2 illustrates a preferred method of spraying the alkaline urea-formaldehyde solution onto the solid fertilizer particles. Referring to FIGURE 1, solid urea stream 1 and aqueous formaldehyde solution stream 2 are passed into mixing vessel 3, which is a unit of conventional design in which the solid urea is dissolved and mixed into the aqueous formaldehyde to produce a stream 4 consisting of aqueous urea-formaldehyde solution. Stream 4 will preferably have a urea to formaldehyde molar ratio in the range of 0.75 to 0.85 mole of urea per mole of formaldehyde, and is passed into mixing vessel 5 for adjustment of pH to a value above 7.0. Vessel 5 is a unit of conventional design for the mixing of fluid streams. An alkaline compound stream 6 is also passed into vessel 5, for mixture with stream 4 to raise the solution pH to a value above 7.0 and preferably in the range of 7.5 to 10.0. Stream 6 consists of any suitable alkaline compounds which do not exert a deleterious effect on the urea-formaldehyde solution. Thus, stream 6 may consist of gaseous or liquid ammonia, ammonium hydroxide, sodium hydroxide, sodium carbonate, potassium hydroxide, potassium carbonate, or calcium hydroxide, or aqueous solutions of these components, or mixtures of these components.

Stream 6 serves to raise the pH of solution stream 4 to a value above 7.0 and preferably in the range of 7.5 to 10.0 within unit 5, and exerts a solubilizing effect on the urea-formaldehyde condensation product or resin, so as to produce a clear solution free of solid components. The resulting liquid solution stream 7 discharged from unit 5 is now suitable for utilization in accordance with the concepts of the present invention.

A conventional fertilizer material consisting of a plurality of discrete fertilizer particles is retained in funnel-shaped hopper 8, and is discharged from unit 8 by regulating valve 9, which is a star valve or other suitable regulating device for controlling the flow of solid particles. The fertilizer material in hopper 8 may consist of any conventional solid fertilizer, such as urea, ammonium nitrate, ammonium sulfate, ammonium phosphate, superphosphate, or triple superphosphate, or a mixture of these components, and may be in the form of prills, crystals, extruded pellets or other suitable conventional solid particulate form.

The solid fertilizer particles pass downwards from valve 9 within unit 8, and flow onto moving belt 10, which is supported and provided with motion as indicated by wheels 11. The solution stream 7 is sprayed or otherwise dispersed onto the solid fertilizer particles on belt 10 by a spray nozzle or other suitable liquid dispersion means, not shown, and the liquid solution rapidly and uniformly coats the solid particles on belt 10, due to the fact that stream 7 is alkaline with a pH above 7.0 and consequently that no solid condensation product phase is present in stream 7.

The moving belt 10 next carries the solid fertilizer particles coated with liquid solution through a drying zone, which may consist of any suitable drying means or procedure and typically consists of a heated zone in which burners 12 are provided, which burn fluid hydrocarbon streams 13 and thus heat the wetted solid fertilizer and rapidly drive off moisture into the ambient atmosphere. In suitable instances, vacuum drying may also be provided. The resulting coated solid fertilizer particles, now covered with a hard solid layer of urea-formaldehyde condensation product, fall from belt 10 into portable hopper 14, and are then transferred to bagging, bulk storage or other conventional product utilization.

Referring now to FIGURE 2, a preferred method of spraying the alkaline urea-formaldehyde solution onto the solid fertilizer particles, so as to achieve a uniform coating, is illustrated. The uncoated fertilizer particles are deposited on moving belt 15, which is supported and provided with motion as indicated by wheel 16. The fertilizer particles fall freely into vertically oriented spray chamber or container 17, and the solution stream 7 described supra is sprayed substantially horizontally into the vertically falling particles by spray nozzles 18. The wet coated solid fertilizer particles then fall or flow from the lower outlet of container 17 onto moving belt 10, for further processing including drying as described supra.

Numerous alternatives within the scope of the present invention, besides those mentioned supra, will occur to those skilled in the art. Thus, the ranges of process variables mentioned supra constitute preferred embodiments for optimum utilization of the process concepts of the present invention, and the invention may be practiced outside of these ranges in suitable instances, except that in all cases the urea-formaldehyde solution must be rendered alkaline with a pH above 7.0 prior to usage in accordance with the present invention.

Stream 1 may alternatively consist of anhydrous liquid urea melt or aqueous urea solution. In the latter instance, stream 2 may consist of anhydrous formaldehyde liquid or gaseous formaldehyde vapor, which would be bubbled or sparged into the body of liquid within unit 3. In some instances both streams 1 and 2 may be substantially anhydrous, in which case a separate stream of water, not shown, may be admitted into unit 3, so that stream 4 will consist of an aqueous liquid solution. Stream 6 may alternatively be added directly into unit 3, together with streams 1 and 2, in which case unit 5 may be omitted. The solid fertilizer material may altrenatively be coated and wetted with stream 7 by direct slurrying of the streams, followed by centrifuging and drying of the solid component, or by other suitable methods. The drying of the wetted solid material on belt 10 may alternatively be carried out by allowing the wetted solid fertilizer particles to freely fall downwards through a tower countercurrent to air which may be pre-heated. With such an arrangement, units 12 and their function may be omitted.

An example of a commercial laboratory test of the procedure of the present invention will now be described.

EXAMPLE

Solid urea crystals in the amount of 56 grams were dissolved in 100 grams of 37% aqueous formaldehyde solution. The pH of the urea-formaldehyde solution was adjusted to 8.5 with ammonium hydroxide, and the resulting clear alkaline solution was sprayed on a mass of urea crystals. The crystals were dried and then stored for one year. After this time interval, the urea crystals were free flowing, and had not caked or agglomerated. It was also determined that good results were obtained over a range of pH for the alkaline solution of 7.5 to 8.5.

We claim:
1. A process for producing a free-flowing fertilizer product which comprises mixing urea, formaldehyde and a soluble alkaline compound into an aqueous liquid phase to form an aqueous alkaline urea-formaldehyde solution having a pH in the range of 7.5 to 10.0, depositing a layer of said solution at said pH on the surface of solid fertilizer particles, and removing water from said solution layer to form a hard solid layer of alkaline urea-formaldehyde condensation product on the surface of said fertilizer particles which produces a free-flowing fertilizer product.

2. The process of claim 1, in which said aqueous alkaline urea-formaldehyde solution having a pH in the range of 7.5 to 10.0 is formed by initially mixing urea and formaldehyde into an aqueous liquid phase, and said alkaline compound is added to the resulting aqueous urea-formaldehyde solution.

3. The process of claim 1, in which said alkaline compounds is selected from the group consisting of ammonia, ammonium hydroxide, sodium hydroxide, sodium carbonate, potassium hydroxide, potassium carbonate, calcium hydroxide, and mixtures thereof.

4. The process of claim 1, in which said aqueous alkaline urea-formaldehyde solution is formed with a molar ratio of urea to formaldehyde in the range of 0.75 to 0.85.

5. A process for producing a free-flowing urea fertilizer product which comprises dissolving solid urea in aqueous formaldehyde solution, adding ammonium hydroxide to the resulting mixed urea-formaldehyde solution to raise the pH of said solution to the alkaline range of 7.5 to 8.5, depositing a layer of said alkaline solution at said pH on the surface of solid urea particles, and removing water from said solution layer to form a hard solid layer of alkaline urea-formaldehyde condensation product on the surface of said urea particles which produces a free-flowing urea fertilizer product.

6. The process of claim 5, in which said aqueous urea-formaldehyde solution is formed with a molar ratio of urea to formaldehyde in the range of 0.75 to 0.85.

References Cited

UNITED STATES PATENTS 2,502,996   4/1950   Rohner et al.

FOREIGN PATENTS 691,577   7/1964   Canada.

OTHER REFERENCES

Amino Resins by John F. Blars, p. 9, Reinhold Publishing Co., 1959.

Encyclopedia of Chemical Technology, 2nd ed., vol. 2, p. 230, John Wiley & Sons, 1963.

S. LEON BASHORE, Primary Examiner

R. D. BAJEFSKY, Assistant Examiner

U.S. Cl. X.R.

71—64; 117—100; 252—384